United States Patent [19]

Tejima et al.

[11] Patent Number: 4,669,532
[45] Date of Patent: Jun. 2, 1987

[54] HEAT EXCHANGER WITH TEMPERATURE RESPONSIVE BYPASS

[75] Inventors: Masahiro Tejima, Omiya; Yoshimitsu Nojima, Kawagoe, both of Japan

[73] Assignee: Kabushiki Kaisha Tsuchiya Seisakusho, Tokyo, Japan

[21] Appl. No.: 602,881

[22] Filed: Apr. 23, 1984

[51] Int. Cl.$^4$ .................................. G05D 23/00
[52] U.S. Cl. ................... 165/36; 165/103; 165/119; 165/167; 236/93 R
[58] Field of Search ............ 165/36, 38, 35, 37, 165/103; 236/93 R, 93 B, 101 C, 101 D, 34.5

[56] References Cited

U.S. PATENT DOCUMENTS

| | | | |
|---|---|---|---|
| 2,275,742 | 3/1942 | Dillon | 236/93 R |
| 2,288,599 | 7/1942 | Ramsaur | 236/34.5 |
| 2,322,047 | 6/1943 | Mormile | 165/36 |
| 2,405,831 | 8/1946 | Jensen | 165/37 |
| 2,428,280 | 9/1947 | Jensen | 236/93 R |
| 2,610,831 | 9/1952 | Jensen | 165/37 |
| 2,698,063 | 12/1954 | Brubaker | 236/93 R |
| 3,068,776 | 12/1962 | Day | 236/93 R |
| 3,743,011 | 7/1973 | Frost | 165/38 |
| 4,193,442 | 3/1980 | Vian | 165/35 |
| 4,360,055 | 11/1982 | Frost | 165/38 |

Primary Examiner—William R. Cline
Assistant Examiner—John K. Ford
Attorney, Agent, or Firm—Schwartz, Jeffery, Schwaab, Mack, Blumenthal & Evans

[57] ABSTRACT

A heat exchanger for exchanging heat between engine lubricating oil and engine coolant comprises a heat exchange element made up of a plurality of stacked and spaced plate type heat exchange units. The heat exchange units are provided with successive flow openings through which the oil introduced from an inlet opening flows. A bypass valve is provided to control the flow of the oil passing through a bypass opening which is in communication with the flow openings of the heat exchange units. The bypass valve is of the oil temperature responsive type and adapted to open the bypass opening at oil temperatures below a predetermined level, thereby bypassing much of the oil in the heat exchange units when oil temperature is so low that cooling of the oil is unnecessary.

12 Claims, 4 Drawing Figures

HEAT EXCHANGER WITH TEMPERATURE RESPONSIVE BYPASS

BACKGROUND OF THE INVENTION

1. Field of the Invention

The present invention relates generally to a heat exchanger for exchanging heat between two liquids, and more particularly to a heat exchanger that is adapted for cooling lubricating oil in an internal combustion engine of the type wherein a heat exchange element is made up of a plurality of stacked plate type heat exchange units.

2. Description of the Prior Art

In connection with heat exhangers or oil coolers adapted for cooling lubricating oil in an internal combustion engine, it is well known that a heat exchange element is made up of a plurality of stacked plate type heat exchange units. In addition, there has been proposed for such heat exhangers, to provide a bypass means in connection with the heat exchange element in order to allow lubricating oil to be discharged without being cooled when the oil temperature is considerably low, which is disclosed in U.S. Pat. No. 4,360,055 entitled "Heat Exchanger". The bypass means includes an oil pressure responsive leaf spring valve which controls the bypass flow of the lubricating oil through a bypass opening in response to oil pressure depending upon oil viscosity, so that the bypass opening is opened when the oil temperature is considerably low.

However, the following difficulties have been encountered in the heat exchanger provided with the above-stated bypass means: Fluttering of the leaf spring valve occurs under the action of intermittent impulsive pressure of the lubricating oil supplied to the heat exchanger element, thereby creating valve fluttering noise. Flow resistance of the lubricating oil passing through the bypass opening is increased at an initial period of valve opening in which the leaf spring valve has still partially covered the bypass opening. Furthermore, there is a possibility of malfunction of the valve in which the leaf spring valve is unavoidably opened in response to a raised flow resistance, for example, created due to clogging in an oil flow passage upstream of the valve, in spite of the fact that the viscosity of the oil is not high.

SUMMARY OF THE INVENTION

The heat exchanger of the present invention comprises a heat exchange element made up of a plurality of successive heat exchange units each including a pair of plates joined together at the peripheral edges to define therebetween an oil chamber through which lubricating oil flows. The heat exchange element is enclosed in a casing to be supplied with engine coolant. The heat exchange units are arranged in spaced series to provide a coolant chamber, through which the engine coolant flows, between each pair of the heat exchange units. Successive flow openings are provided in the successive heat exchange units in the series so that the lubricating oil introduced from an inlet flows through the flow openings. A bypass opening is formed in the vicinity of and in communication with the flow openings. Additionally, an oil temperature responsive bypass valve is provided to control the flow of the oil through the bypass opening in response to the temperature of the lubricating oil in the heat exchanger.

Thus, the bypass valve is operated in response to the oil temperature and therefore is effectively prevented from malfuction, avoiding fluttering noise creation and flow resistance increase.

BRIEF DESCRIPTION OF THE DRAWINGS

The features and advantages of the heat exchanger according to the present invention will be more clearly appreciated from the following description taken in conjunction with the accompanying drawings in which the same reference numerals designate the corresponding parts and elements, and in which.

DETAILED DESCRIPTION OF THE INVENTION

Figure 1:
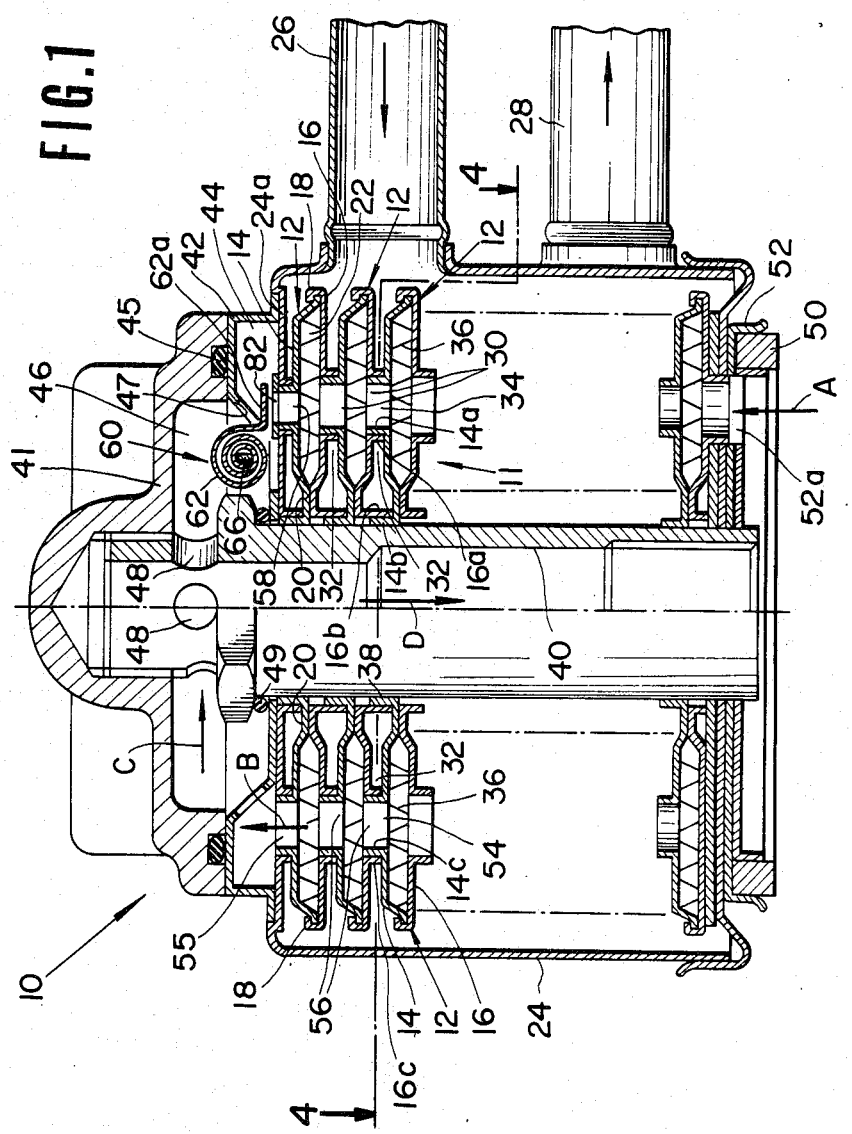
FIG. 1 is a vertical sectional view of an embodiment of the heat exchanger in accordance with the present invention.
Figure 2:
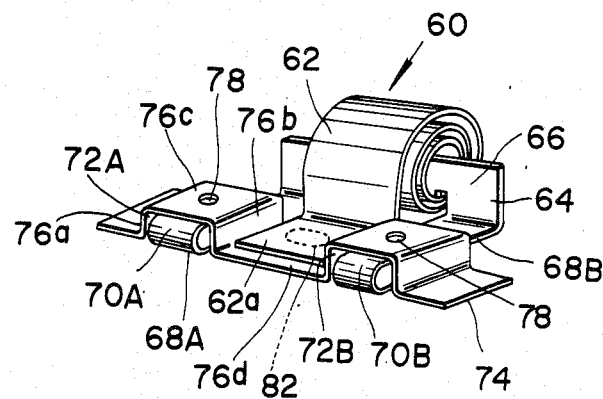
FIG. 2 is an enlarged perspective view of a bypass valve used in the heat exchanger of FIG. 1.
Figure 3:
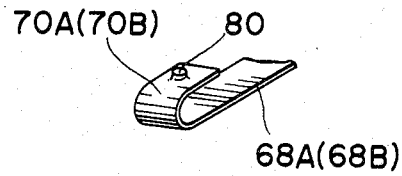
FIG. 3 is a perspective view of a part of the bypass valve of FIG. 2, showing the part which cannot be depicted in FIG. 2.

Referring now to FIGS. 1 to 3, there is shown an embodiment of a heat exchanger or oil cooler 10 in accordance with the present invention. The oil cooler is used in combination with an internal combustion engine for the purpose of cooling engine lubricating oil with engine coolant such as engine cooling water. The oil cooler 10 is, in this instance, mounted at its bottom (in FIG. 1) on an engine block (not shown). As illustrated, the oil cooler 10 comprises a heat exchange element 11 made up of a plurality of heat exchange units 12 shown in assembled relationship in FIG. 1. Each of these heat exchange units 12 comprises a pair of annular upper and lower plates 14 and 16 joined together at their outer peripheral edges in such a manner that the upper and lower plates are held in spaced apart position, forming an outer joined section 18. In this instance, each plate 14, 16 is made of stainless steel. Additionally, the upper and lower plates 14 and 16 are also joined together at their inner peripheral portions, forming an inner joined section 20. Such joining of the plates 14 and 16 is accomplished by way of brazing, so that the inner and outer joined sections 18 and 20 maintain their fluid tight seal. Accordingly, the upper and lower plates 14 and 16 define with the inner and outer joined sections 18, 20 an internal oil chamber 22 through which the lubricating oil flows.

The heat exchange units 12 are arranged in a superimposed stack to constitute the heat exchange element which is enclosed by a generally cylindrical casing 24. The cylindrical casing 24 is provided with coolant inlet and outlet 26 and 28 through which the oil cooler 10 is fluidly connected to an engine cooling system (not shown) so that engine coolant is supplied to and discharged from the interior of the casing 24 through the coolant inlet and outlet 26 and 28, respectively.

Figure 4:
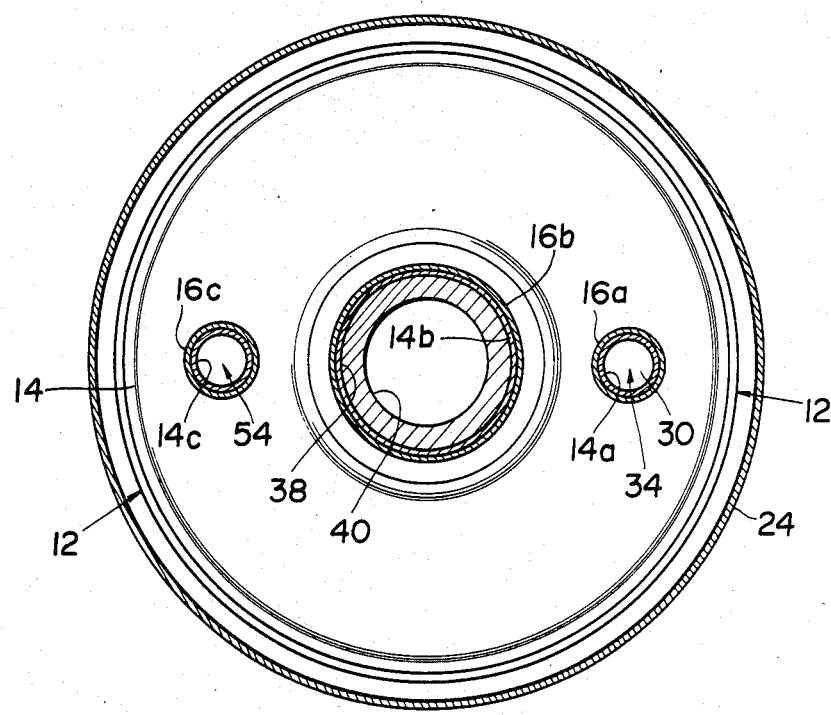
FIG. 4 is a transverse sectional view taken in the direction of the arrows substantially along the line 4—4 of FIG. 1.

As shown on the right-half side of the heat exchange element 11 in FIGS. 1 and 4 the pair of upper and lower plates 14 and 16 constituting the individual heat exchange units 12 are provided with aligned successive openings 30 which serve as flow openings to provide access to and from the internal oil chambers 22. The opening 30 of the upper plates 14 is defined by an upwardly projected cylindrical section 14a while the opening 30 of the lower plate 16 is defined by a downwardly projecting cylindrical section 16a. It is to be noted that the cylindrical section 14a of one heat exchanger unit 12 securely fits in the cylindrical section 16a of the other adjacent heat exchanger unit 12 maintaining a fluid tight seal therebetween. Fixing the both cylindrical sections 16a and 16b are accomplished by way of brazing.

The thus fixed cylindrical sections 14a and 16a serve to arrange the heat exchange units 12 in spaced series to provide a plurality of successive coolant chambers 32 between the heat exchange units 12. These coolant chambers 32 are, of course, for the coolant which flows in through the coolant inlet 26 and flows out through the coolant outlet 28. The fixed cylindrical sections 14a and 16a separate the openings 30 from the coolant chambers 32, and form thereinside an oil inlet manifold 34 through which the oil flows and from there laterally into the oil chambers 22. A turbulizer or fin 36 is disposed within each oil chamber 22 to provide agitation to the oil and thus increase the heat transfer between the oil and the coolant. Any type turbulizer may be used as this turbulizer 36.

As illustrated, the inner peripheral section of the upper plate 14 is formed with an upwardly projecting cylindrical section 14b while the inner peripheral section of the lower plate 16 is formed with a downwardly projecting cylindrical section 16b. It is to be noted that the cylindrical section 16b of one heat exchange unit 12 securely fits in the cylindrical section 14b of the other adjacent heat exchange unit 12, maintaining a fluid tight seal therebetween. Fixing of both cylindrical sections 14b and 16b are accomplished by way of brazing. Thus, a central opening 38 is defined by the fixed cylindrical sections 14a and 16b. The fixed cylindrical sections 14b and 16b also function to maintain a space or coolant chamber 32 between the adjacent heat exchange units 12. It will be appreciated that any special spacers are unnecessary in this embodiment since the fixed cylindrical sections 14b and 16b as well as the fixed cylindrical sections 14a, 16b serve as spacers between the adjacent heat exchange units 12.

A pipe 40 is disposed to be projected through the central openings 38 and surrounded by the fixed cylindrical sections 14b and 16b. The pipe 40 is hollow and formed at its lower inner surface with a threaded portion (no numeral) which is to be engaged with a threaded extension (not shown) on the engine block, and at its top outer surface with a threaded portion (no numeral) which is in threaded engagement with a cover member 41.

The upper end 24a of the cylindrical casing 24 is provided with a sheet metal dome 42 that is shaped to provide an annular peripheral chamber 44. This chamber 44 serves as a stabilizing mounting for the cover member 41 which is provided with a gasket 45, of an O-ring type, between the cover member 41 and the dome 42. The cover member 41 defines therein an oil flow passage 46 which is communicated with the annular chamber 44 through an opening 47 and further communicated with the hollow of the pipe 40 through openings 48 formed at the upper section of the pipe 40. The reference numeral 49 denotes an O-ring for maintaining a fluid tight seal between the dome 42 and the pipe 40. An annular gasket 50 is provided on the bottom of the heat exchanger 10 between a bottom gasket plate 52 and an adjacent surface (not shown) of the engine block. The gasket plate 52 is formed with an oil inlet opening 52a which is, in this case, in communication with and in alignment with each opening 30 defined by the fixed cylindrical sections 14a and accordingly with the oil inlet manifold 34. The lower plate 16 of the heat exchange unit 12 at the lowest position is secured through a member (no numeral) to the bottom end (no numeral) of the casing 24.

As shown on the left-half side of the heat exchanger element 11 in FIGS. 1 and 4, an oil outlet manifold 54 is so formed as to establish fluid communication among the heat exchange units 12 similarly to the above-stated oil inlet manifold 34. Therefore, the oil outlet manifold 54 is constituted by arranging the successive openings 56 of the upper and lower plates 14 and 16 in alignment with each other. The openings 56 are defined by upwardly projecting cylindrical sections 14c of the upper plates 14 and downwardly projecting cylindrical sections 16c of the lower plates 16. Additionally, the cylindrical sections 14c sealingly fit in the cylindrical sections 16c, respectively, in the same manner as in the above-stated cylindrical sections 14a and 16a. It is to be noted that the oil outlet manifold 54 is separate and independent from the oil inlet manifold 34; however, they communicate with each other through the oil chamber 22 defined by the upper and lower plates 14 and 16. The oil outlet manifold 54 communicates with the annular chamber 44 through an oil outlet opening 55 formed at the upper end 24a of the casing 24. It is to be noted that the oil outlet opening 55 is located on the opposite side of the oil inlet opening 52a with respect to the pipe 40. The oil outlet opening 55 communicates through the annular chamber 44 with the oil passage 46.

The upper end 24a of the casing 24 is provided with a bypass or valve opening 58 which is in direct communication with and in alignment with the opening 30 of the upper plate 14 of the upper-most heat exchange unit 12. Therefore, the valve opening 58 is in alignment with the oil inlet manifold 34 and accordingly in alignment with the oil inlet 52a of the gasket plate 52. It is to be noted that the bypass opening 58 is located on the opposite side of the oil outlet opening 55 with respect to the pipe 40.

A bimetal operated bypass valve 60 is provided to control the flow of oil through the bypass opening 58 in response to the temperature of the oil in the oil cooler 10. The bypass valve 60 comprises a helical bimetal element 62 which is securely supported at its centrally located one end by a support member 64. The support member 64 includes a laterally elongate vertical section 66 to which the helical bimetal element 62 is secured. Two leg sections 68A and 68B are integral with the vertical section 64 at the opposite end sections, respectively, and elongate perpendicularly relative to the vertical section 64. Each leg section 68A, 68B is curled at its free end to form a curled end 70A, 70B. The curled ends 70A and 70B are being detachably inserted in two tunnels 72A and 72B, respectively, defined by a bent base plate member 74 which is secured on the surface of the upper end 24a of the casing 24 by a suitable manner, so that the leg sections 68A, 68B are in contact with the surface of the upper end 24a. Each tunnel 72A, 72B is formed by oppositely disposed vertical walls 76a and 76b, and a top flat wall 76c which is formed with a hole 78 into which a projection 80 formed on the upper surface of the curled end 70A, 70B fits, so that the leg sections 68A, 68B are securely located in position.

The helical bimetal element 62 is formed at its free end with a flat valve flap 62a which is contactable with the base plate member 74 at the central section 76d which is located between the tunnels 70A and 70B and in contact with the casing upper end 24a. Accordingly, the valve flap 62a can close an opening 82 formed through the base plate member central section 76d, the opening 82 coinciding with the bypass opening 58. The bypass valve 60 is arranged to be opened to cause the bypass opening 58 as well as the opening 82 to open when the temperature of the oil in the oil cooler 10 is below a predetermined level (for example, about 50° C.).

The operation of the oil cooler 10 will be hereinafter discussed.

When the temperature of the oil in the oil cooler 10 is relatively high so that cooling of the oil is necessary, oil of a high temperature is introduced through the oil inlet 52a of the gasket plate 52 into the oil inlet manifold 34, and permitted to flow into the plural heat exchange units 12 as indicated by an arrow A, to be cooled under the cooling action of the engine coolant flowing to the coolant chambers 32. The thus cooled oil is gathered into the oil outlet manifold 54 and discharged from the heat exchange element 11 through the oil outlet 55 as indicated by an arrow B to be introduced through the oil passage 46 into the hollow of the pipe 40 as indicated by an arrow C. The oil thereafter flows downwardly through the hollow of the pipe 40 as indicated by an arrow D to be fed into the engine block.

When the temperature of the oil is relatively low and below the a predetermined level, such as about 50° C., in which cooling of the oil is unnecessary, the helical bimetal element 62 of the bypass valve 60 is distorted to cause the valve section 62a to lift upwardly in the drawing, thereby allowing the bypass opening 58 as well as the opening 82 to open. As a result, the oil introduced into the oil inlet manifold 34 is permitted to directly pass through the bypass opening 58 to the oil passage 46, thus bypassing much of the volume of the oil chambers 22. In this instance, there will, of course, be some oil that will pass through the oppositely located opening 55 but because of the direct alignment of the bypass opening 58 with the inlet opening 52a the amount of oil passing through the oil chambers 22 be relatively small. Thus, the oil introduced in the oil cooler 10 is fed back to the engine block without being cooled in the case where the oil temperature is so low that cooling is not required.

Thus, the bypass valve 60 is operated only in response to the oil temperature regardless of the oil pressure and therefore is prevented from creating a fluttering noise due to intermittent impulsive oil pressure and from malfunction due to pressure rise in an oil passage upstream of the bypass valve 60 which pressure rise is caused, for example, by clogging of the oil passage.

The bypass valve 60 is so constructed that the valve flap 62a lifts generally parallelly with a plane containing the opening 82 as well as a plane containing the bypass opening 58. Consequently, a wide or fully opened state is established for the opening 82 as well as the bypass opening 58, thereby avoiding a considerable increase in flow resistance of the oil passing through the bypass opening 58.

While only a single heat exchanger has been shown and described as of an embodiment, it will be appreciated that the heat exchanger may be used in combination with an oil filter in which the oil flowing through the heat exchange element 11 is fed to the oil filter, the filtered oil is fed back to the engine block. In this case, the dome 42 and the annular peripheral chamber 44 may serve as a stabilizing mounting for the oil filter.

What is claimed is:

1. A heat exchanger for exchanging heat between first and second liquids, comprising:

a plurality of successive heat exchange units each including first and second plates joined together at peripheral edges to define therebetween a first chamber for said first liquid;

a casing having inlet and outlet means for said second liquid and enclosing said plurality of heat exchange units;

means for arranging said heat exchange units in a spaced sequence of successive heat exchange units in said casing to provide a second chamber for said second liquid between each pair of said heat exchange units and also for separating said first chambers from said second chambers;

means defining an inlet opening through said casing for introducing said first liquid into one of said heat exchanger units;

means defining first successive flow openings through said successive heat exchange units in said sequence, said first flow openings communicating with one another and communicating with said inlet opening and said first chambers to permit flow of said first liquid into said first chambers;

means defining a bypass opening through which said first liquid is dischargeable from said heat exchange units, said bypass opening communicating with said first flow openings to provide a direct flow path from said inlet opening; and an oil temperature responsive bypass valve which opens to allow said first liquid to flow through said bypass opening when the temperature of said first liquid is below a predetermined level, said oil temperature responsive bypass valve including a helical bimetal element having a first end, and a second end provided with a valve flap, a support member to which said bimetal element is suported at the first end, said support member having first and second leg plate sections, each leg plate section being curled at one end portion thereof to form a straight extending proper part and a curled end part which is generally parallel with said proper part and said one curled end part being formed at its upper surface with a projection, and a base plate member secured to a part of said casing and being formed with first and second bent sections each of which defines thereinside a tunnel in which said one end portion of said support member leg plate section is insertable, each of first and second bent sections being formed with a hole into which said projection of said curled end part of each leg plate section is insertable, said base plate member being formed with a discharge opening communicating with said bypass opening, said discharge opening being closable with said valve flap of said bimetal at temperatures of said first liquid in which cooling of said first liquid is required.

2. A heat exchanger as claimed in claim 1, wherein said first successive flow openings and said inlet and bypass openings are so arranged as to form a straight flow path for the first liquid.

3. A heat exchanger as claimed in claim 1, wherein said first successive flow openings are aligned with each other, and said inlet and bypass openings are aligned with said first successive flow openings.

4. A heat exchanger as claimed in claim 1, further comprising means defining an outlet opening through which said first liquid in said heat exchange units is dischargeable, said outlet opening being located further from said first successive flow openings than said bypass opening.

5. A heat exchanger as claimed in claim 4, further comprising means defining second successive flow openings in said successive heat exchange units, said second flow openings being separate from said first flow openings, one of said second flow openings being located in the vicinity of and communicating with said outlet opening.

6. A heat exchanger as claimed in claim 5, wherein said second flow openings are aligned with each other and with said outlet opening.

7. A heat exchanger as claimed in claim 1, wherein said arranging means includes a first cylindrical section forming part of said heat exchange unit first plate, and a second cylindrical section forming part of said heat exchange unit second plate, said first cylindrical section of one of a pair of adjacent heat exchange units being sealingly engaged with said second cylindrical section of the other of said pair of heat exchange units.

8. A heat exchanger as claimed in claim 1, further comprising means defining said second chambers, said means including a third cylindrical section formed at an inner peripheral portion of said heat exchange unit first plate, and a fourth cylindrical section formed at an inner peripheral portion of said heat exchange unit second plate, said third cylindrical section of one of a pair of adjacent heat exchange units being sealingly engaged with said fourth cylindrical section of the other of said pair of heat exchange units.

9. A heat exchange as claimed in claim 1, wherein said oil temperature responsive valve includes means for lifting said valve flap generally parallelly with a plane containing said bypass opening.

10. A heat exchanger as claimed in claim 1, wherein said first liquid is engine lubricating oil while said second liquid is engine coolant.

11. A heat exchanger as claimed in claim 1, wherein said support member includes a laterally elongate plate section to which said bimetal element first end is connected, said first and second leg plate sections being integral with said laterally elongate plate section and parallely and perpendicularly extending from said laterally elongate plate section, said base plate member extending parallel with said laterally extending plate section.

12. A heat exchanger as claimed in claim 11, wherein each of said first and second bent sections off said base plate member includes two oppositely disposed vertical walls, and a top flat wall integrally connecting said two vertical walls and formed with said hole into which said projection is insertable, said curled end part of said leg plate section being contactable with said top flat wall.

* * * * *